United States Patent [19]
Hoki et al.

[11] Patent Number: 4,629,745
[45] Date of Patent: Dec. 16, 1986

[54] EXPANDABLE POLYETHERIMIDE COMPOSITIONS AND FOAMED MATERIALS OBTAINED THEREFROM

[75] Inventors: Tsuneo Hoki; Yutaka Matsuki, both of Suzuka, Japan

[73] Assignee: Asahi Kasei Kogyo Kabushiki Kaisha, Osaka, Japan

[21] Appl. No.: 800,195

[22] Filed: Nov. 21, 1985

[30] Foreign Application Priority Data

Nov. 22, 1984 [JP] Japan .................................. 59-247579
Jul. 25, 1985 [JP] Japan .................................. 60-162973

[51] Int. Cl.⁴ ................................................ C08J 9/14
[52] U.S. Cl. ......................................... 521/87; 521/88; 521/98; 521/154; 521/180; 521/183; 521/184; 521/185; 521/189
[58] Field of Search .................... 521/87, 88, 98, 154, 521/180, 183, 184, 185, 189

[56] References Cited

U.S. PATENT DOCUMENTS 4,361,453 11/1982 Gagliani et al. ................. 521/139
4,367,296 1/1983 Gagliani et al. ................. 521/189
4,535,100 8/1985 Krutchen et al. ................. 521/81
4,579,878 4/1986 Krutchen et al. ................. 521/98

FOREIGN PATENT DOCUMENTS 2433175 10/1975 Japan .
3600483 8/1983 Japan .
36139 2/1984 Japan .
145222 8/1984 Japan .

Primary Examiner—Morton Foelak
Attorney, Agent, or Firm—Armstrong, Nikaido, Marmelstein & Kubovcik

[57] ABSTRACT

An expandable polyetherimide composition comprising (A) polyetherimide and (B) a blowing agent containing in the said agent at least 10% by weight of a volatile organic foaming component having a solubility parameter $[\delta_c]$ satisfying the following equation $$\delta_p - 1.14 \leq \delta_c \leq \delta_p + 1.14,$$

wherein $\delta_p$ is the solubility parameter of the polyetherimide, a dielectric constant of not less than 15, and a boiling point at normal pressure of not higher than 80° C.; and a foam material obtained therefrom.

7 Claims, No Drawings

EXPANDABLE POLYETHERIMIDE COMPOSITIONS AND FOAMED MATERIALS OBTAINED THEREFROM

BACKGROUND OF THE INVENTION

1. Field of the Invention

This invention relates to an expandable polyetherimide composition. More particularly, it relates to an expandable composition which gives a useful polyetherimide foam which is excellent in heat resistance and non-flammability, does not emit harmful smoke and flames even in a fire, and is useful as a heat insulating material and a shock absorbing material, and to a foamed material obtained therefrom.

2. Description of the Prior Art

As to heat insulating materials and shock absorbing materials excellent in heat resistance, there have been hitherto known foamed materials of various heat resistant polymers, for example that of poly(2,6-dimethylphenylen oxide) (U.S. Pat. No. 3,492,249) and those of polysulfone, polyarylsulfone and polyethersulfone [Japanese Patent Application Kokoku (Past-Exam Publn) No. 36004/83]. However, these heat resistant resins are essentially non-inflammable and moreover emit a large amount of smoke in a fire. Accordingly, they cannot be used as interior finish materials of aeroplanes, vehicles and motorcars.

Besides the above-mentioned foamed materials, there have been also proposed polyimide foam [Japanese Patent Application Kokai (Laid Open) No. 145222/84] and heat resistant foamed materials formed of resins having a glass transition point of 140° C. or higher [Japanese Patent Application Kokai (Laid Open) No. 36139/84]. However, though the former is excellent in heat resistance and substantially emits no harmful smoke and flame, it has drawbacks in that it requires the use of expensive raw materials and moreover gives final products of high moisture absorption. On the other hand, the latter has defects in that it has a open cell content resulting in a poor heat insulating property, and moreover has poor mechanical strength and shock absorbing property. Thus, they are both not satisfactory as heat resistant foamed material.

SUMMARY OF THE INVENTION

The object of this invention is to provide a polyetherimide foam which can overcome these difficulties of previous heat resistant resin foam, is excellent in heat resistance and non-inflammability, does not substantially emit harmful smoke and flames even in fires, is excellent in such mechanical properties as heat insulating property and compressive strength, chemical durability such as resistance to high temperature moisture, shock absorbing property, and has a closed cell content not less than 60%, preferably not less than 80%, and an expandable composition which can give the foam.

DETAILED DESCRIPTION OF THE INVENTION

After extensive studies the present inventors have found that a composition comprising a polyetherimide and an organic blowing agent containing a specified amount of a specified volatile organic compound can answer the above-mentioned object, and have accomplished this invention based on the finding.

Thus, according to this invention, there are provided an expandable polyetherimide composition comprising (A) polyetherimide and (B) blowing agent containing therein at least 10% by weight of a volatile organic foaming component having a solubility parameter [$\delta_c$] satisfying the following equation:

$$\delta_p - 1.14 \leq \delta_c \leq \delta_p + 1.14,$$

wherein $\delta_p$ is the solubility parameter of the polyetherimide, a dielectric constant of not less than 15, and a boiling point at normal pressure of not higher than 80° C.; and a foamed material obtained from said composition.

The polyetherimide used in the composition of this invention can be produced by known methods (U.S. Pat. Nos. 3,803,085, 3,838,097, 3,847,867, 3,983,093, 3,989,670, 3,991,004, and 4,293,683). For example there can be used polyetherimides which consist essentially of the chemically combined units shown by the general formula

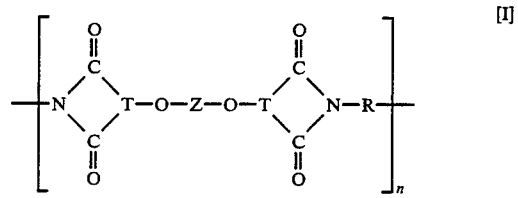

wherein —O—T⟨ is

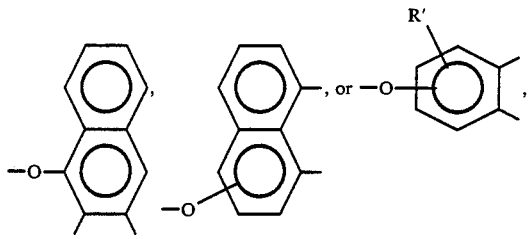

R' being a hydrogen atom, an alkyl group or an alkoxy group;

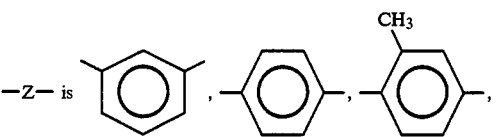

—Z— is

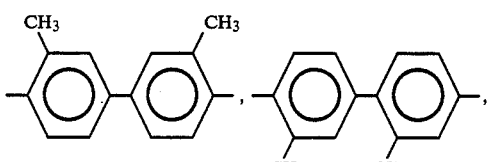

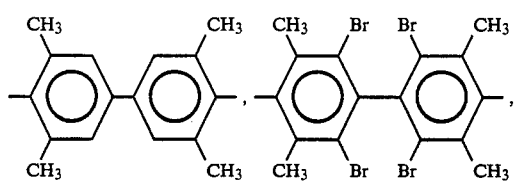

-continued

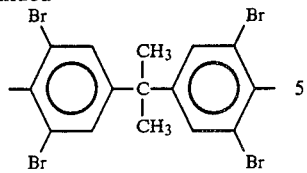

or a divalent radical containing the units shown by the formula

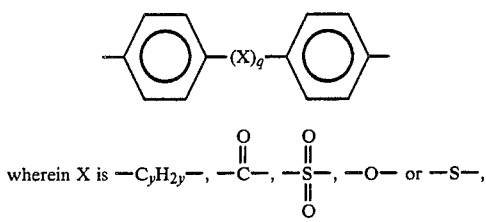

wherein X is $-C_yH_{2y}-$, $-\overset{\overset{O}{\|}}{C}-$, $-\overset{\overset{O}{\|}}{\underset{\underset{O}{\|}}{S}}-$, $-O-$ or $-S-$, q is 0 or 1, and y is an integer of from 1 to 5; —R— is a divalent aromatic hydrocarbon radical having 6 to 20 carbon atoms or a halogenated derivative thereof, a divalent alkylene or cycloalkylene radical having 2 to 20 carbon atoms, a polydiorganosiloxane terminated with an alkylene group having 2 to 8 carbon atoms, or a divalent radical containing the units shown by the formula

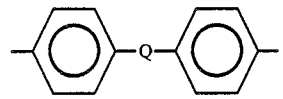

wherein Q is $-O-$, $-CO-$, $-\overset{\overset{O}{\|}}{\underset{\underset{O}{\|}}{S}}-$, $-S-$ or $C_xH_{2x}$, x being an integer of from 1 to 5; and n is a value which is larger than 1 and gives an intrinsic viscosity of polyetherimide of at least 0.1, preferably at least 0.35.

These polyetherimides have in general a solubility parameter ($\delta_p$) in the range of 10.65 to 11.18.

For example, a polyetherimide used in this invention can be given as follows:

One consisting of the following chemically combined units

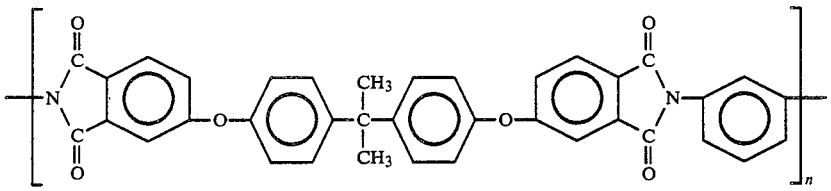

and having a solubility parameter of 10.76, a glass transition point of 216° to 222° C., and a thermal decomposition temperature of 535° C.; one consisting of the following chemically combined units

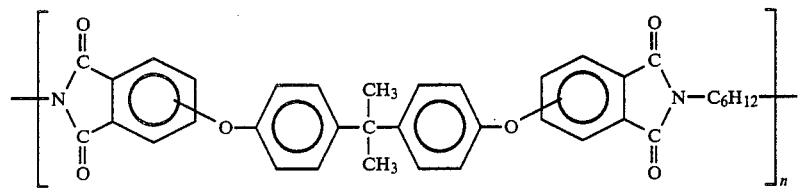

and having a solubility parameter of 10.87 and a glass transition point of 121° C.;

one consisting of the following chemically combined units

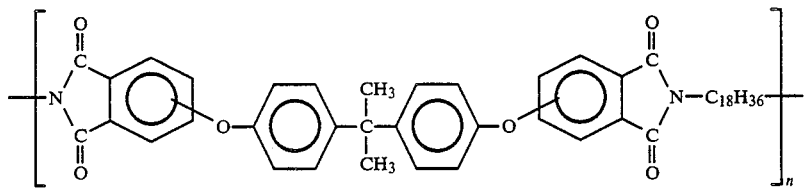

and having a solubility parameter of 11.1 and a glass transition point of 202° C.;

one consisting of the following chemically combined units

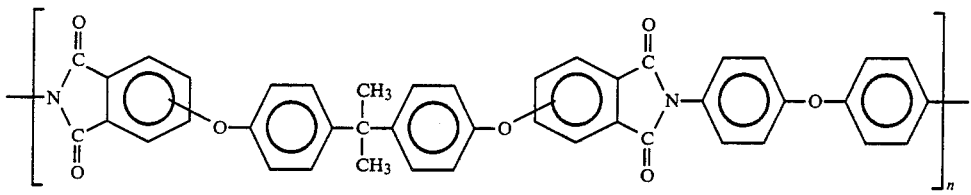

and having a solubility parameter of 10.75, a glass transition point of 196° to 221° C., and a thermal decomposition temperature of 410° to 420° C.; and one consisting of the following chemically combined units

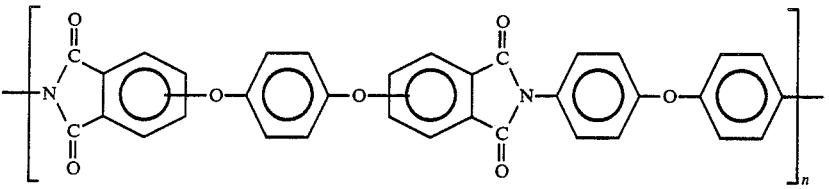

and having a solubility parameter of 10.76, a glass transition point of 237° C., and a thermal decomposition temperature of 430° C.

Besides these polyetherimides, there can be optionally used in this invention products obtained by capping the molecular chain terminal of these polyetherimides with phthalic anhydride, copolymers wherein at least one of the acid component

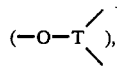

the ether component (—O—Z—O—) and the amine component (—R—) in the above-mentioned general formula [I] consists of two or more kinds of radicals, or blended products of these polymers, or further as desired, blended products of these polymers with another polymer.

These polyetherimides are used after properly selected to have suitable characteristics for intended purposes. For example, when used as a structural material or heat insulating material for high temperatures the polyetherimide has preferably a high glass transition point of 200° C. or higher, whereas when a foamed material excellent in shock absorbing property is to be obtained it has preferably a glass transition point of lower than 140° C. When a foamed material is formed by extrusion foaming, it is advantageous to use a mixture comprising 10 to 90% by weight of a resin having a glass transition point of 200° C. or higher and 90 to 10% by weight of a resin having a glass transition point of lower than 140° C., since the foamed material obtained has a good surface appearance and a good state of surface layer cells. Further, resins which have a thermal decomposition temperature at which the weight loss by heating reaches 5% of 300° C. or higher are advantageous in that they give a smaller amount of smoke in a fire.

The blowing agent used in the composition of this invention should contain at least 10% by weight of a volatile organic foaming component having a solubility parameter [$\delta_c$] satisfying the following equation.

$$\delta_p - 1.14 \leq \delta_c \leq \delta_p + 1.14,$$

wherein $\delta_p$ is the solubility paramter of polyetherimide; a dielectric constant of not less than 15; and a boiling point at normal pressure of not higher than 80° C. Blowing agents containing a volatile organic foaming component whose solubility parameter does not satisfy the above-mentioned equation are difficultly impregnated into or mixed with a polyetherimide. Even when the impregnation or mixing can be effected, pinholes or cracks are developed at the cell wall during the foaming process, and hence foam materials with closed cells cannot be obtained. Further, the said volatile organic foaming component must have a dielectric constant of not less than 15. Blowing agents containing a volatile organic foaming component which, though having a solubility parameter satisfying the above-mentioned equation, has a dielectric constant of not less than 15 give rise to pinholes and cracks at the cell wall and hence does not give a foamed material with closed cells even when they are easily impregnated to or mixed with polyetherimide.

The term "blowing agent" of the present invention may also contain a mixture of compounds and/or agents having blowing properties.

The reason why a volatile organic foaming component which has a dielectric constant in a specified range in addition to a solubility parameter in a specified range is particularly excellent as a blowing agent and gives a foamed material of closed cells in this invention is not definitely clear. However, it is presumably because owing to the interaction of such a component with the polar group of said polyetherimide, the viscoelasticity and the elongation characteristic of the expandable composition come to fall within a range suitable for foaming process.

The above-mentioned volatile organic foaming component should have a boiling point of not higher than 80° C. at normal pressure. A component having the boiling point of higher than 80° C. is unfavorable since it tends to develop cracks at the cell wall when the pressure in the cell becomes negative during the cooling step conducted immediately after foaming.

The volatile organic foaming component of this invention has preferably a solubility parameter $[\delta_c]$ in the range:

$$\delta_p - 0.9 \leq \delta_c \leq \delta_p + 0.9$$

because then the cells of product foam have a diameter of 0.1 mm or more and the surface adhesive strength of the foam is high.

A foaming component which has a $\delta_c$ in the range:

$$\delta_p - 0.9 \leq \delta_c \leq \delta_p + 0.9$$

and a dielectric constant of 16 or more is more preferable because then the product foam has a closed cell content of 80% or more, has excellent mechanical characteristics inclusing compressive strength, tensile strength and shear strength and further, in adhesive processing, does not give rise to poor adhesion due to the excessive penetration of adhesives.

Further, a foaming component which has a boiling point of not higher than 65° C. at normal pressure is favorable in that it gives foamed materials of smooth surface in expansion forming of board- or cylinder-shaped products and further permits an easy forming.

Examples of the volatile organic foaming component of this invention include acetone or a mixture of at least one member selected from the following group A with at least one member selected from the following group B.

Group A: acetone, methyl ethyl ketone, methyl chloride, 1,1-dichloroethane, ethyl chloride, methylene chloride;

Group B: methanol, ethanol.

Further, any of the above-mentioned volatile organic foaming components may be incorporated with another compound miscible therewith, such as water, in a range of amount which keeps the resulting mixture within the scope defined in this invention.

As to specific examples of the volatile organic foaming component of this invention there may be mentioned, for instance when polyetherimide is the one obtained from 2,2-bis[4-(3,4-dicarboxyphenoxy)-phenyl] propane dianhydride and m-phenylenediamine (Ultem 1000, a trade name, mfd. by General Electric Co., Ltd., Solubility parameter: 10.76), acetone, methylene chloride/ethanol (weight ratio: 74/26 to 38/62), ethyl chloride/methanol (weight ratio: 78/22 to 53/47), 1,1-dichloroethane/methanol (weight ratio: 85.6/14.4 to 58/42), methyl chloride/methanol (weight ratio: 86.7/13.3 to 59/41), methylene chloride/methanol (weight ratio: 81.9/18.1 to 67.1/32.9), methyl ethyl ketone/methanol (weight ratio: 94.2/5.8 to 51/49), acetone/methanol (weight ratio: 100/0 to 57/43) and acetone/water (weight ratio: 100/0 to 82.5/17.5).

The blowing agent used in this invention may be the volatile organic foaming component specified above used alone or a mixture containing at least 10% by weight of said volatile organic component. Examples of other blowing agents which can be used to form the above-mentioned mixture include those which do not dissolve the polyetherimide, such as dichlorodifluoromethane, dichlorotetrafluoroethane, trichlorofluoromethane, trichlorotrifluoroethane, butane, pentane, and carbon tetrachloride.

Further, there may be mixed a chemical blowing agent which evolves inert gas such as nitrogen or carbon dioxide by heating, for example azodicarbonamide, p-toluenesulfonyl semicarbazide, and 5-phenyltetrazole.

When the volatile organic foaming component of this invention is used in the form of a blowing agent mixture, the content of the former in said mixture should be at least 10% by weight as mentioned above. When the content is less than 10% by weight, uniform impregnation or mixing of the blowing agent with polyetherimide is difficult, foaming takes place with difficulty, and foamed products of closed cells cannot be obtained.

The proportion of the organic blowing agent and polyetherimide used in the composition of this invention is generally 5 to 40 parts by weight of the organic blowing agent relative to 100 parts by weight of polyetherimide. The preferable amount of the organic blowing agent to be used is selected properly depending on the properties required for the foamed material to be obtained, the intended density of the material, and other factors.

The composition of this invention can assume any desired form including powders, granules and sheets. The preparation of the composition can be conducted by conventional methods, for example one which comprises bringing a gaseous or liquid organic blowing agent into contact with powdery or granular polyetherimide to effect impregnation or one which comprises heating and melting polyetherimide in a melt-processing machine such as an extruder, then injecting the organic blowing agent into it under pressure and mixing them uniformly.

The production of foamed materials using the expandable polyetherimide composition of this invention can be conducted by known methods, which include, for example, a method which comprises contacting the said composition with steam, heated oil or heated air stream to effect foaming, and filling the foamed granules thus obtained in a mould followed by heating to form the intended product; one which comprises filling the said composition in a pressure mould and then conducting expansion moulding in the mold; or one which comprises melting the said composition under pressure in an extruder, then cooling it down to a temperature appropriate for foaming, and extruding it into a region of atmospheric or low pressure to effect forming. Among these methods, the one which comprises feeding the expandable polyetherimide composition to an extruder and then extruding it to effect foaming is particularly preferable in that it enables industrial, continuous production of foamed materials of uniform quality. A formed board material having a large sectional area useful as the core material of a light-weight composite panel can be produced by this method.

The foamed material obtained from the expandable composition of this invention can be in the form of a cylindrical column, square pillar, cylinder, sheet, board, or block, and also a more complicated profile or moulded article, and thus can be produced in various forms depending on intended uses. Particularly, those of the form of cylindrical column, cylinder or board are useful for using, after combined with plastics, filler-reinforced plastics, fiber-reinforced plastics, metal plates, or other inorganic sheet material on their surface to form a composite material, as machine parts such as robot arms and exterior panels of machines; as materials for interior walls, ceilings and floors or seat backboards and the like, of aeroplanes, vehicles and motorcars; and, after being moulded while the said composite is being prepared, as ski boards, reflector boards of parabolic antenna and the like. The cell structure of these foamed materials may be either isotropic one or anistropic one elongated in one or two directions. However, when the foamed material is used in a composite interior panel for aeroplanes, vehicles and motorcars, it has preferably an anisotropic cell structure obtained by elongating the cell unidirectionally in the direction of the thickness of foamed material to increase the compressive strength in the thickness direction. For composite panels, there can be used a foamed material which has a skin layer containing thin film of substantially unexpanded polyetherimide formed on its surface of the panel surface side or one obtained by slicing the above-mentioned skin layer off to expose a cellular cross section. In the latter case wherein the skin layer is sliced off, the average diameter of cells appearing on the cross section is preferably in the range of 0.1 to 3 mm because then an excellent adhesive strength can be obtained.

The density of the foamed material obtainable from the composition of this invention can be selected as desired depending on intended uses. However, considering the original purpose of using a foamed material, it is usually selected in the range of 0.4 0.02 g/cm$^3$, preferably 0.2 to 0.03 g/cm$^3$, in view of light weight, rigidity and processability.

The composition of this invention may be incorporated, as desired, with additives conventionally used in foamed materials, such as coloring agents, inorganic fillers, antioxidants, lubricants, cell controlling agents, and antistatic agents.

The solubility parameters of volatile organic compound referred to in this invention are values described in Brandrup et al., Polymer Handbook, 2nd. Edition, IV, pp. 337 to 359. The solubility parameters of resins not described in the literature were calculated according to the method of Hoy [Saburo Akiyama et al. Polymer Blend (published by C.M.C. Co.) pp. 127 to 129; or Journal of Paint Technology, 42, 76 (1970)].

The solubility parameter of a mixture was calculated from the equation $$\delta_c = \phi_1 \delta_1 + \phi_2 \delta_2 + \ldots$$

wherein $\phi_i$, i being 1, 2, ---, indicates the volume fraction of each component of the mixture.

The dielectric constant is the ratio of electric capacity ($C_x$) to the capacity in vaccum ($C_o$) ($E_r = C_x/C_o$) determined by the capacity bridge method at a temperature of 20° C. at a frequency in the low-frequency region. For compounds of low boiling points which are gaseous at 20° C. under atmospheric pressure, the determination was conducted after liquefying them at equilibrium pressures under which they become liquid.

EFFECT OF THE INVENTION

The expandable polyetherimide composition of this invention uses as an organic blowing agent those containing a volatile organic compound having a solubility parameter, a dielectric constant, and a boiling point each in a specified range. The polyetherimide foamed material obtained from said composition has a closed cell content of at least 60%, preferably at least 80%, is excellent in heat resistance and non-inflammability, does not emit substantially harmful smoke and flames even in a fire, and further excellent in such mechanical properties as heat insulating property and compressive strength, chemical durability such as resistance to high temperature moisture, and shock absorbing property. Consequently, it is very useful as heat insulating materials and shock absorbing materials.

Particularly, foam materials having a density in the range of 0.4 to 0.02 g/cm$^3$, preferably 0.2 to 0.03 g/cm$^3$, a closed cell content of not lower than 60%, preferably not lower than 80%, and an average cell diameter in the range of 0.1 to 3 mm, preferably 0.15 to 2 mm, are extremely useful as the core material for light-weight laminated panels and composite materials.

This invention will be explained in more detail below with reference to Examples.

In the Examples, the porperties of formed materials were evaluated by the following methods.

Density: determined according to ASTM D 1622,
Open cell content: determined by the air pycnometer method according to ASTM D 2856,
Average cell diameter: The foamed material was sliced to about 1 to 2 mm thickness and projected at an enlargement ratio of 25. The major and the minor axis were measured for 20 or more randomly selected cells and averaged overall to give the average cell diameter.
Compressive strength: determined according to ASTM D 1621 using a specimen of 30 mm square and 20 mm thickness,
Flatwise tensile strength: determined according to ASTM C 297 using a specimen of 25 mm square and 20 mm thickness.

EXAMPLE 1 to 8

A granular polyetherimide (ULTEM 1000, a trade name, mfd. by General Electric Co.) obtained from 2,2-bis[4-(3,4-dicarboxyphenoxy)phenyl]-propane dianhydride and m-phenylenediamine and having a solubility parameter of 10.76 and acetone were placed in a pressure vessel and heated at 70° C. for 16 hours to impregnate 16 parts by weight of acetone to 100 parts by weight of the polyetherimide. The expandable polyetherimide composition obtained was heated by steam to obtain foamed granules. The foamed granules had a density of 0.0635 g/cm$^3$, a closed cell content of 82%, and an excellent cushoning property.

Foamed materials were obtained in the same manner as mentioned above except for using the volatile organic foaming components listed in Table 1. The properties of the foamed materials obtained are shown in Table 1.

When the expandable compositions of Examples 6 and 8 are allowed to stand in the air for one week, they come to give only foamed materials of extremely small (0.1 mm or less) cell diameter; when a steel plate is bonded to the surface of these foamed materials, peeling takes place at the bonded surface, and only a laminated panel of smaller flatwise adhesive strength is obtained as compared with other foamed materials.

TABLE 1

| Example No. | Blowing agent Type (Composition, wt. ratio) | Solubility parameter | Dielectric constant | B.p. (°C.) | Amount of impregnated blowing agent (parts by wt./ 100 parts by wt. resin) | Foamed material Density (g/cm³) | Closed cell content (%) | Average cell diameter (mm) | Remarks |
|---|---|---|---|---|---|---|---|---|---|
| 1 | Acetone | 9.9 | 21.45 | 65 | 16 | 0.0635 | 82 | 1.2 | Uniform foaming |
| 2 | Methylene chloride/ethanol (70/30) | 10.9 | 16 | 41 | 11 | 0.045 | 80 | 0.7 | Uniform foaming |
| 3 | 1,1-Dichloroethane/methanol (77/23) | 10.8 | 17.5 | ca. 60 | 7 | 0.070 | 83 | 1.1 | Uniform foaming |
| 4 | Methyl chloride/methanol (73/27) | 11.2 | 17.6 | ca. −20 | 13 | 0.061 | 84 | 1.0 | Uniform foaming |
| 5 | Acetone/water (82/18) | 11.9 | 32 | ca. 65 | 9 | 0.048 | 85 | 1.3 | Uniform foaming |
| 6 | Methyl ethyl ketone/methanol (93/7) | 9.7 | 16.5 | 78 | 12 | 0.062 | 60 | 0.2 | Mixed with fine cells |
| 7 | Ethyl chloride/methanol (75/25) | 10.7 | 15.2 | ca. 14 | 10 | 0.051 | 60 | 0.9 | Uniform foaming |
| 8 | Ethyl chloride/methanol (57/43) | 11.7 | 20 | — | 7 | 0.062 | 60 | 0.2 | Mixed with fine cells |

COMPARATIVE EXAMPLES 1 to 12

Expandable polyetherimide compositions were obtained and then heated by steam to obtain foamed granules in the same manner as in Example 1 except for using as the blowing agent methyl ethyl hetone, ethyl chloride, 1,1,1-trichloroethane, chloroform, benzene, isopropanol, methyl chloride and methylene chloride, respectively. The properties of the foamed granules obtained are shown in Table 2.

As is apparent from Tables 1 and 2, the expandable polyetherimide compositions obtained by using a blowing agent comprising at least 10% by weight of volatile organic foaming component having properties specified in this invention, namely a solubility parameter in the range of 9.62 to 11.9, a dielectric constant of not less than 15 and a boiling point of not higher than 80° C. expand uniformly to 10 times the original volume or more and the resulting foamed materials have a closed cell content of not less than 60%, or even not less than 80%, whereas those obtained by using a blowing agent containing essentially other volatile organic compounds give either unhomogeneous foamed materials or foamed materials which, though homogeneous, is deficient in closed cells and of a poor quality.

Particularly, the compositions which contain volatile organic foaming component having a solubility parameter in the range of 9.86 to 11.66 (i.e., $\delta_p - 0.9 \leq \delta_c \leq \delta_p + 0.9$) and a dielectric constant of not less than 16 are favorable since they give a closed cell content of not less than 80%.

TABLE 2

| Example No. | Blowing agent Type (Composition, wt. ratio) | Solubility parameter | Dielectric constant | B.p. (°C.) | Amount of impregnated blowing agent (parts by wt. 100 parts by wt. resin) | Foamed materials Density (g/cm³) | Closed cell content (%) | Average cell diameter (mm) | Remarks |
|---|---|---|---|---|---|---|---|---|---|
| 1 | Methyl ethyl ketone | 9.3 | 15.45 | 79.6 | 14 | 0.064 | 8 | 0.6 | Cracks in cell wall |
| 2 | Ethyl chloride | 9.2 | 11.7 | 12 | 15 | 0.159 | 0 | — | Mixed with voids |
| 3 | 1,1,1-Trichloroethane | 8.97 | 6.5 | 74 | 10 | 0.20 | 0 | — | Mixed with voids |
| 4 | Chloroform | 9.24 | 4.9 | 61 | 20 | 0.065 | 0 | 1.5 | Cracks in cell wall |
| 5 | Benzene | 8.9 | 2.24 | 80 | 15 | 0.089 | 0 | — | Not uniformly foaming |
| 6 | Isopropanol | 11.2 | 18.62 | 82.3 | 10 | 0.210 | 0 | — | Not uniformly foaming |
| 7 | Methyl chloride | 9.7 | 11.4 | −23.8 | 15 | 0.110 | 0 | 2.0 | Pinholes in cell wall |
| 8 | Methylene chloride | 9.7 | 9.1 | 40.4 | 15 | 0.066 | 0 | 2.0 | Pinholes in cell wall |
| 9 | Methylene chloride/ethanol (35/65) | 12.1 | 21.5 | — | 11 | 0.20 | 13 | 1.5 | Mixed with large voids |
| 10 | Ethyl chloride/methanol (50/50) | 12 | 21 | — | 6 | 0.17 | 8 | 1.5 | Cracks in cell wall |
| 11 | Ethyl chloride/methanol (82/18) | 10.26 | 14 | — | 9 | 0.10 | 8 | 1.5 | Cracks in cell wall |
| 12 | Methyl chloride/dichlorotetrafluoroethane (33/67) | 7.5 | 5.6 | — | 20 | 0.045 | 8 | 1.6 | Pinholes in cell wall |

EXAMPLE 9

To pellets obtained by impregnating 0.61 part by weight of water to 100 parts by weight of a polyetherimide (Ultem 1000, a trade name, mfd. by General Electric Co.), was impregnated 26 parts by weight of a mixed blowing agent, dichlorotetrafluoroethane/-methylene chloride (weight ratio: 82/18), to obtain an expandable polyetherimide composition.

The composition thus obtained was made to expand by heating it at 150° C. for 60 seconds. The foamed material obtained had a density of 0.06 g/cm$^3$ and a closed cell content of 80%.

The solubility parameter of the methylene chloride/-water mixture system in the above-mentioned composition is 11.8.

COMPARATIVE EXAMPLE 13

A polyetherimide composition was obtained in the same manner as in Example 9 except for using polyetherimide pellets which have been dried by heating then at 180° C. for 16 hours. The composition obtained was expanded by heating it at 150° C. for 60 seconds. The resulting foamed material had a density of 0.06 g/cm$^3$ and a closed cell content of 30%.

EXAMPLES 10 to 13

Expandable compositions were obtained in the same manner as in Example 1 except that the blowing agents listed in Table 3 were respectively used for impregnation. When the impregnated amount is insufficient at heating conditions of 70° C. and 16 hours, the temperature as well as the time was increased to obtain the intended expandable composition.

The expandable composition thus obtained was heated by steam to obtain foamed granules. The properties of the foamed granules obtained are shown in Table 3.

As is apparent from the Table 3, the foamed granules were of uniform and high ratio expansion and had a closed cell content of 80% or more.

COMPARATIVE EXAMPLES 14 and 15

Expandable compositions were obtained and foamed granules were prepared therefrom in the same manner as in Example 1 except for using the blowing agents listed in Table 3, respectively. The properties of the foamed granules are shown in Table 3. As is apparent from the Table, the foamed granules had a high open cell content and were of poor quality.

TABLE 3

| | Blowing agent composition (weight ratio) | Volatile organic foaming component | | | Amount of impregnated blowing agent (parts by wt./ 100 parts by wt. resin) | Foamed material | | | Remarks |
| | | Solubility parameter | Dielectric constant | B.p. (°C.) | | Density (g/cm$^3$) | Closed cell content (%) | Average cell diameter (mm) | |
| --- | --- | --- | --- | --- | --- | --- | --- | --- | --- |
| Example | | | | | | | | | |
| 10 | Dichlorotetrafluoroethane/acetone (90/10) | 9.9 | 21.45 | 65 | 4.5 | 0.127 | 90 | 1.2 | Impregnated at 80° C. for 170 hours |
| 11 | Dichlorotetrafluoroethane/acetone (50/50) | 9.9 | 21.45 | 65 | 12 | 0.040 | 90 | 0.7 | Impregnated at 80° C. for 96 hours |
| 12 | Dichlorotetrafluoroethane/acetone (10/90) | 9.9 | 21.45 | 65 | 15 | 0.036 | 85 | 1.0 | — |
| 13 | Dichlorotetrafluoroethane/methylene chloride/methanol (82/14/4) | 11.2 | 16 | ca. 41 | 13 | 0.041 | 92 | 1.6 | — |
| Comparative Example | | | | | | | | | |
| 14 | Dichlorotetrafluoroethane/acetone (95/5) | 9.9 | 21.45 | 65 | 3 | 1.1 | — | <0.1 | — |
| 15 | Dichlorotetrafluoroethane/methylene chloride/methanol (92/6/2) | 11.2 | 16 | ca. 41 | 4 | 0.21 | 50 | <0.1 | — |

EXAMPLE 14

An expandable composition obtained by impregnating previously 100 parts by weight of a polyetherimide (Ultem 1000, a trade name, mfd. by General Electric Co.) with 9 parts by weight of acetone was supplied to an extrusion foaming apparatus comprising an extruder having a bore diameter of 40 mm and L/D of 24 fitted at its head with a slit nozzle having an opening gap of 0.804 mm and an opening width of 5.2 mm, and melted at 210° C. Then, 1 part by weight of dichlorotetrafluoroethane per 100 parts by weight of the resin was pressed into the apparatus through a blowing agent-injecting apparatus attached to the outlet side of the extruder. The composition was mixed uniformly and extruded through the nozzle cooled at 195° to 198° C. into the air to effect forming. The extruded material was holded down, while being foamed, from its upper and lower sides with forming plates attached to the extrusion nozzle to obtain a foamed material formed in a board. The foamed board material obtained had a thickness of 12 mm, a width of 40 mm, a density of 0.048 g/cm$^3$, a closed cell content of 98%, an average cell diameter in the thickness direction of 1.6 mm, an average cell diameter in the board surface of 1.1 mm, and a compresive strength in the thickness direction of 7 kg/cm$^2$ (10% strain). Then, the skin layers of both sides of the foamed material were sliced off to expose cellular cross sections. To the both sides of the foamed board thus obtained, were bonded under a pressure of 3 kg/cm$^2$ steel plates (0.3 mm thick) to which an epoxy resin adhesive had been applied. The resulting laminated panel had a flatwise tensile strength of 19.0 kg/cm$^2$.

EXAMPLE 15

An extruded foamed board was prepared in a similar manner to that in Example 14 except that talc was added to the expandable composition impregnated with acetone. The amount of talc and that of dichlorotetrafluoroethane injected were varied to obtain foamed boards having an average cell diameter shown in Table 4, a density of 0.052 to 0.056 g/cm³ and a closed cell content of 81 to 86%. The laminated panels prepared in the same manner as in Example 14 had a flatwise tensile strength shown in Table 4.

COMPARATIVE EXAMPLE 16

A foamed material having an average cell diameter of 0.09 mm was obtained in the same manner as in Example 15 but by increasing the amount of talc further. Separately, a foamed material having an average cell diameter of 5 mm was obtained in the same manner as in Example 14 except that no dichlorotetrafluoroethane was injected. The laminated panels prepared from these foamed materials in the same manner as in Example 14 had properties shown in Table 4.

Table 4 shows that foamed materials having an average cell diameter of 0.1 mm to 3 mm at the surface are more excellent in flatwise tensile strength.

TABLE 4

| | Average cell diameter (mm) | Compressive strength (kg/cm²) | Flatwise tensile strength (kg/cm²) | Remarks |
|---|---|---|---|---|
| Example 15 | 0.15 | 5.0 | 19.0 | Material ruptures. |
| | 0.5 | 4.7 | 17.8 | Material ruptures. |
| | 1 | 4.0 | 17.0 | Material ruptures. |
| | 3 | 3.8 | 17.2 | Material ruptures. |
| Comparative Example 16 | 0.09 | 3.2 | 12.9 | Partial peeling at bonded surface |
| | 5 | 3.0 | 12.2 | Partial peeling at bonded surface |

EXAMPLE 16

A polyethermide was prepared from 2,2-bis [4-(3,4-dicarboxyphenoxy)phenyl]propane dianhydride and hexamethylene diamine with reference to Example 8 described in U.S. Pat. No. 3,847,867. The product obtained has a glass transition point of 121° C., an intrinsic viscosity of 0.40 as determined in a methylene chloride solution, and a solubility parameter of 10.88 as calculated by the method of Hoy.

The polymer was fed to an extruder of 30 mm bore diameter and heated at 200° C. to be molten. Twenty one parts by weight of an acetone/dichlorotetrafluoroethane mixture (weight ratio: 80/20) per 100 parts by weight of the polymer were fed through a blowing agent-injecting apparatus provided on the outlet side of the extruder. The whole was uniformly molten and mixed to give an expandable composition. Then, the expandable composition was cooled down to 140° C. through a cooling apparatus connected to the outlet of the extruder, and extruded through a nozzle attached to the end of the cooling apparatus into the air to effect foaming.

The foamed material obtained was in the form of a cylindrical column with a diameter of about 30 mm, was uniform, and had a density of 0.032 g/cm³, a closed cell content of 95%, and a compressive strength of 10 kg/cm².

EXAMPLE 17

The polyetherimide used in Example 1 and the one used in Example 16 were blended in a ratio of 80/20 by weight, and then treated in the same manner as in Example 16 to obtain an expandable polyetherimide composition. The composition was then extruded under atmospheric pressure to effect foaming. Thus, a homogeneous foamed material was obtained which had a density of 0.081 g/cm³, a closed cell content of 96%, and a compressive strength of 16 kg/cm². The material had a smooth surface and uniformly distributed cells.

What is claimed is:

1. An expandable polyetherimide composition comprising (A) polyetherimide and (B) a blowing agent containing in the said agent at least 10% by weight of a volatile organic foaming component having a solubility parameter $[\delta_c]$ satisfying the following equation $$\delta_p - 1.14 \leq \delta_c \leq \delta_p + 1.14$$

wherein $\delta_p$ is the solubility parameter of the polyetherimide, a dielectric constant of not less than 15, and a boiling point at normal pressure of not higher than 80° C.

2. A composition according to claim 1 wherein the volatile organic foaming component is a member selected from the following (1) or (2):
   (1) acetone;
   (2) a mixture of at least one member selected from the following group A and at least one member selected from the following group B:
   group A: acetone, methyl ethyl ketone, methyl chloride, 1,1-dichloroethane, ethyl chloride, methylene chloride;
   group B: methanol, ethanol.

3. A composition according to claim 1, wherein the volatile organic foaming component has a $\delta_c$ satisfying the equation:

$$\delta_p - 0.9 \leq \delta_c \leq \delta_p + 0.9,$$

a dielectric constant of not less than 15, and a boiling point at normal pressure of not higher than 80° C.

4. A composition according to claim 2, wherein the volatile organic foaming component has a $\delta_c$ satisfying the equation:

$$\delta_p - 0.9 \leq \delta_c \leq \delta_p + 0.9,$$

a dielectric constant of not less than 16, and a boiling point at normal pressure of not higher than 80° C.

5. A composition according to claim 4, wherein the volatile organic foaming component has a boiling point at normal pressure of not higher than 65° C.

6. A composition according to claim 1, wherein the polyetherimide is one consisting essentially of the chemically combined units shown by the general formula,

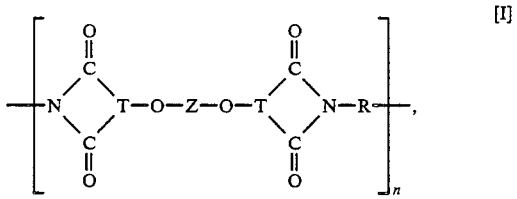

wherein —O—T is

-continued

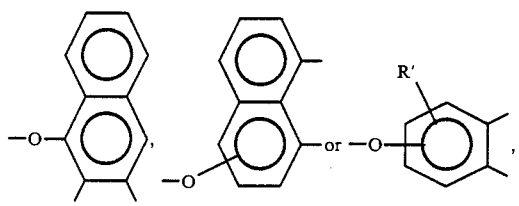

R' being a hydrogen atom, an alkyl group or an alkoxy group; —Z— is

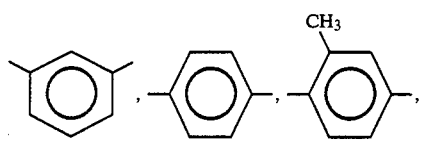

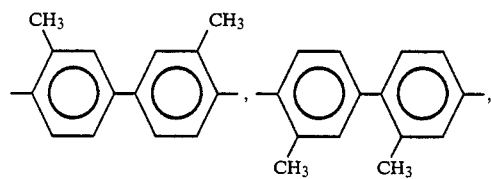

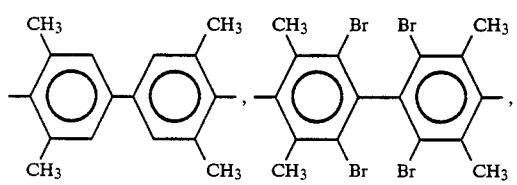

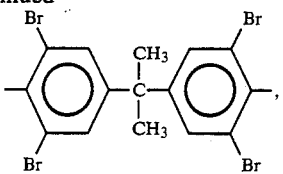

or a divalent radical containing the units shown by the formula

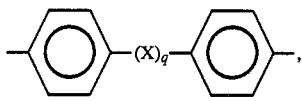

wherein X is $-C_yH_{2y}-$, $-\overset{O}{\underset{\|}{C}}-$, $-\overset{O}{\underset{\underset{\|}{O}}{\overset{\|}{S}}}-$, $-O-$ or $-S-$, q is 0 or 1, and y is an integer of from 1 to 5; —R— is a divalent aromatic hydrocarbon radical having 6 to 20 carbon atoms or a halogenated derivative thereof, a divalent alkylene or cycloalkylene radical having 2 to 20 carbon atoms, a polydiorganosiloxane terminated with an alkylene group having 2 to 8 carbon atoms, or a divalent radical containing the units shown by the formula

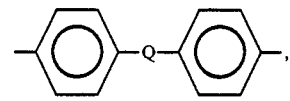

wherein Q is $-O-$, $-CO-$, $-\overset{O}{\underset{\underset{\|}{O}}{\overset{\|}{S}}}-$, $-S-$ or $C_xH_{2x}$, x being an integer of from 1 to 5; and n is value which is larger than 1 and gives an intrinsic viscosity of polyetherimide of at least 0.1.

7. A composition according to claim 1, wherein the intrinsic viscosity of polyetherimide is not lower than 0.35.

* * * * *